(No Model.)
A. G. ALEXANDER.
VALVE.
No. 284,587. Patented Sept. 11, 1883.
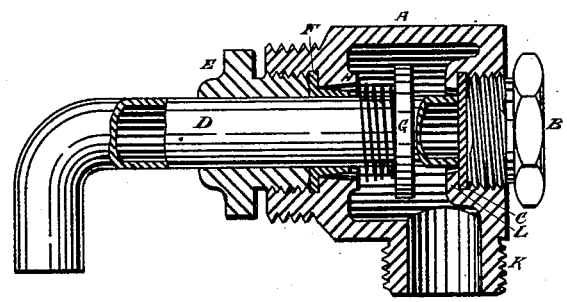
WITNESSES
Cyrus E. Lothrop
Sumner Collins
INVENTOR
A. G. Alexander
per Geo. H. Lothrop
Attorney
N. PETERS. Photo-Lithographer, Washington, D. C.

UNITED STATES PATENT OFFICE.

ALEXANDER G. ALEXANDER, OF DETROIT, MICHIGAN, ASSIGNOR TO JOHN GILLIARD, OF NEW YORK, N. Y.

VALVE.

SPECIFICATION forming part of Letters Patent No. 284,587, dated September 11, 1883.

Application filed March 24, 1883. (No model.)

*To all whom it may concern:*

Be it known that I, ALEXANDER G. ALEXANDER, of Detroit, in the county of Wayne and State of Michigan, have invented a new and useful Improvement in Valves, of which the following is a specification.

The drawing represents a vertical section, the tube D being shown in elevation with two parts broken away.

My invention consists in a valve having a movable discharge-pipe, the inner end of which controls the flow of water through the valve.

A represents the shell of a valve, similar to a common angle-valve, having thereon a screw-thread, K, by which the valve can be coupled to a pipe.

B represents a nut, which screws into shell A at the point where the valve-stem of an ordinary valve passes through the shell.

C represents a washer or disk of packing, the rim of which is pressed by nut B against a shoulder, L, on the inner end of the recess in shell A, into which nut B screws.

D represents a metal tube open at its inner end and open at its outer end to discharge water either into a tank or a pipe.

F represents a cup-shaped leather or rubber packing, through which tube D slides water-tight. Packing F is held in place by a hollow nut, E, through which tube D slides.

G represents a projecting ring fastened on tube D, and is for the purpose of taking the thrust of a spring, I, the other end of which bears against shoulder H in shell A when it is desired to make the valve self-closing.

To open the valve tube D is drawn out. To close the valve tube D is pushed in until its inner end seats against disk C and stops the flow of water through the valve.

What I claim as my invention, and desire to secure by Letters Patent, is—

1. In a valve, the combination of the shell A, having shoulder H, the movable discharge-tube D, packing-ring F, disk C, and spring I, constructed and operating substantially as described.

2. The combination of the shell A, having shoulders H and L, the movable discharge-tube D, packing-ring F, disk C, spring I, and screw-plug B, said screw-plug B serving to securely hold the disk to its seat on the shoulder L, substantially as described.

A. G. ALEXANDER.

Witnesses:
SUMNER COLLINS,
CYRUS E. LOTHROP.